(12) United States Patent
Lee

(10) Patent No.: US 9,843,705 B2
(45) Date of Patent: Dec. 12, 2017

(54) PROJECTION DEVICE

(71) Applicant: HON HAI PRECISION INDUSTRY CO., LTD., New Taipei (TW)

(72) Inventor: Ming-Chuan Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 423 days.

(21) Appl. No.: 14/685,242

(22) Filed: Apr. 13, 2015

(65) Prior Publication Data

US 2016/0227175 A1 Aug. 4, 2016

(30) Foreign Application Priority Data

Feb. 3, 2015 (TW) .............................. 104103634 A

(51) Int. Cl.
*G03B 21/14* (2006.01)
*H04N 9/31* (2006.01)
*H04N 5/225* (2006.01)
*G03B 21/00* (2006.01)
*G03B 21/28* (2006.01)

(52) U.S. Cl.
CPC ......... *H04N 5/2253* (2013.01); *G03B 21/005* (2013.01); *H04N 9/3141* (2013.01); *H04N 9/3194* (2013.01); *G03B 21/145* (2013.01); *G03B 21/28* (2013.01); *H04R 2499/15* (2013.01)

(58) Field of Classification Search
CPC .. G03B 21/147; G03B 21/005; G03B 21/006; G03B 21/008; G03B 17/54; H04N 9/31; H04N 9/3185; H04N 9/3188
See application file for complete search history.

(56) References Cited

U.S. PATENT DOCUMENTS

| 8,469,518 B2 * | 6/2013 | Togawa | H04N 9/3182 353/121 |
| 2009/0115915 A1 * | 5/2009 | Steinberg | H04N 9/3194 348/745 |
| 2013/0113975 A1 * | 5/2013 | Gabris | G03B 17/54 348/333.1 |

* cited by examiner

*Primary Examiner* — William C Dowling
(74) *Attorney, Agent, or Firm* — ScienBizIP, P.C.

(57) ABSTRACT

A projection device includes a shell, a motherboard, a projection module and a image capturing module. The motherboard, the projection module and the image capturing module are all fixed in the shell. The motherboard transmits image data of a project. The projection module receives the image data and projects images to a projection medium. The image capturing module captures playing images on the projection medium and transmits the playing image to the motherboard. The motherboard further determines next image according to the playing image and transmits the next image to the projection module.

20 Claims, 4 Drawing Sheets

PROJECTION DEVICE

CROSS-REFERENCE TO RELATED APPLICATIONS

This application claims priority to Taiwan Patent Application No. 104103634, filed on Feb. 3, 2015, the contents of which are incorporated by reference herein.

FIELD

The subject matter herein relates to projection devices.

BACKGROUND

Projection devices are applied to amusement centers and offices. The projection device generally includes a host, a projector, a camera and an audio device. The host, the projector, the camera and the audio device are different fixed devices.

BRIEF DESCRIPTION OF THE DRAWINGS

Implementations of the present technology will now be described, by way of example only, with reference to the attached figures.

DETAILED DESCRIPTION

Figure 1:
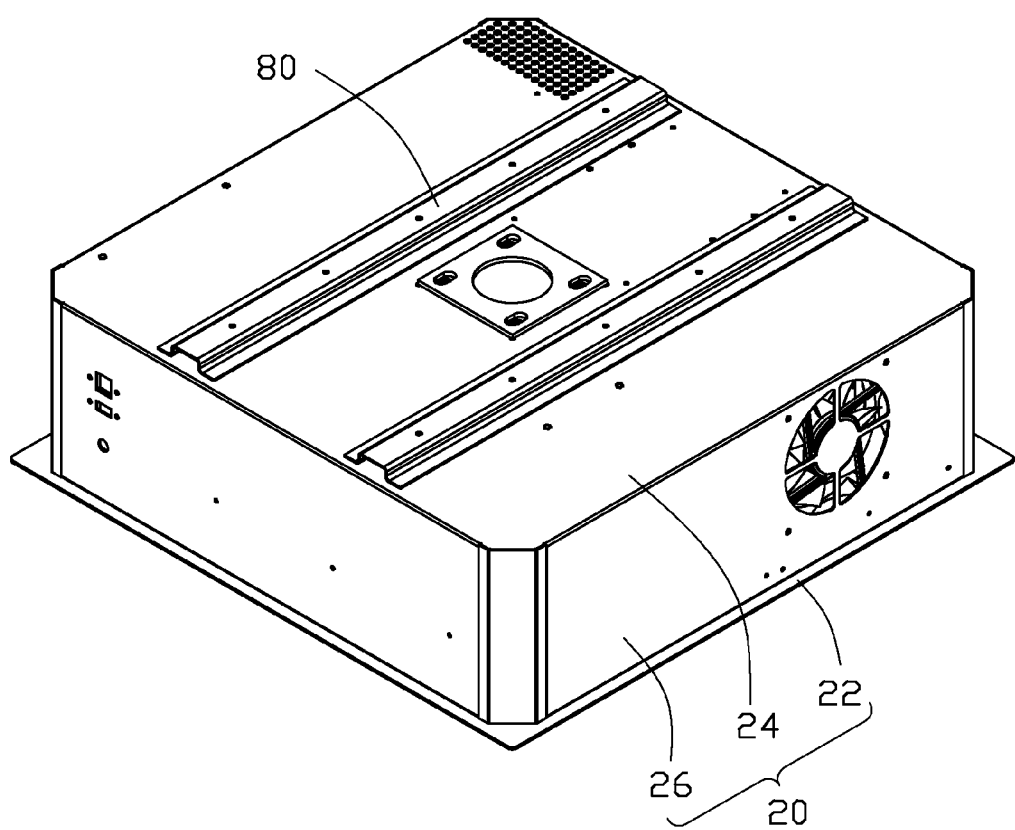
FIG. 1 is an isometric view of a projection device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

FIG. 1 illustrates a projection device 100 includes a shell 20 and a fixing module 80. The shell 20 includes a top shell 22, a bottom shell 24 and a sidewall 26 fixed between the top shell 22 and the bottom shell 24. The fixing module 80 is fixed to the bottom shell 24.

Figure 3:
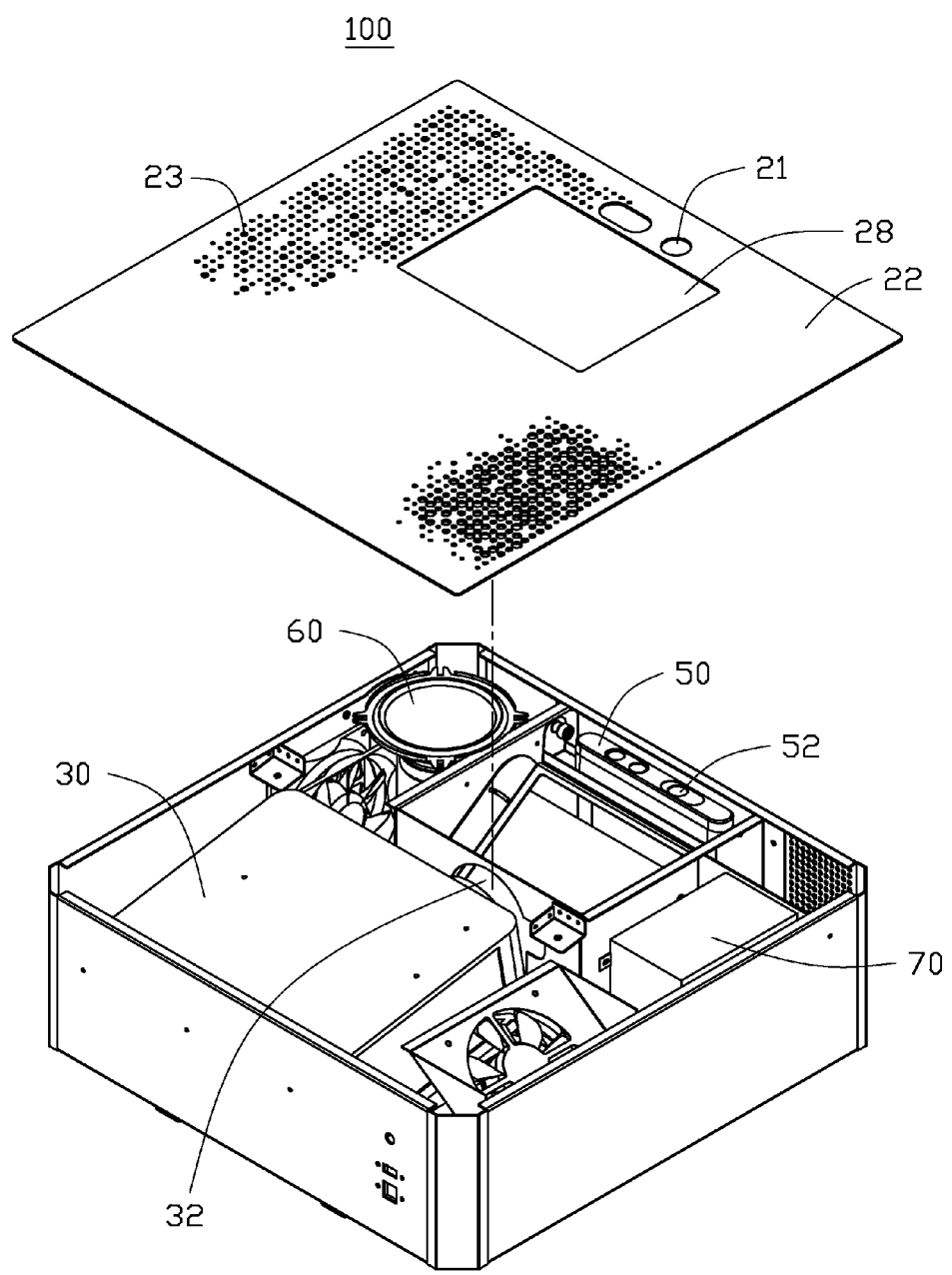
FIG. 3 is an exploded isometric view of the projection device in FIG. 2.
Figure 4:
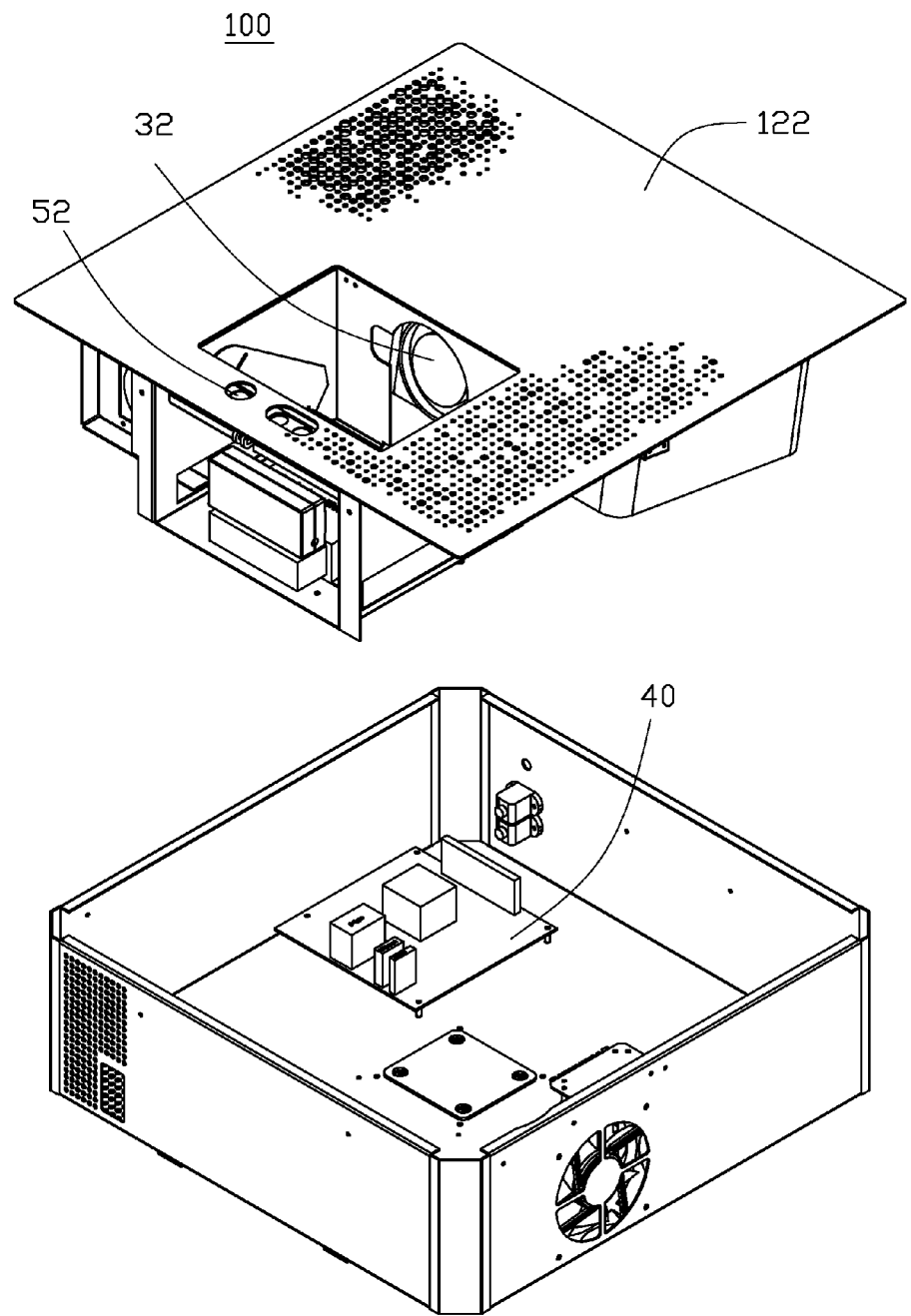
FIG. 4 is similar to FIG. 3, but viewed from another angle.

FIGS. 3 and 4 illustrate the projection device 100 further includes a projection module 30, a motherboard 40, an image capturing module 50, a loudspeaker 60 and a power module 70. The projection module 30, the motherboard 40, the image capturing module 50, the loudspeaker 60 and the power module 70 are fixed in the shell 20. The power module 70 electrically connects to and provides power to the projection module 30, the motherboard 40, the image capturing module 50 and the loudspeaker 60.

Figure 2:
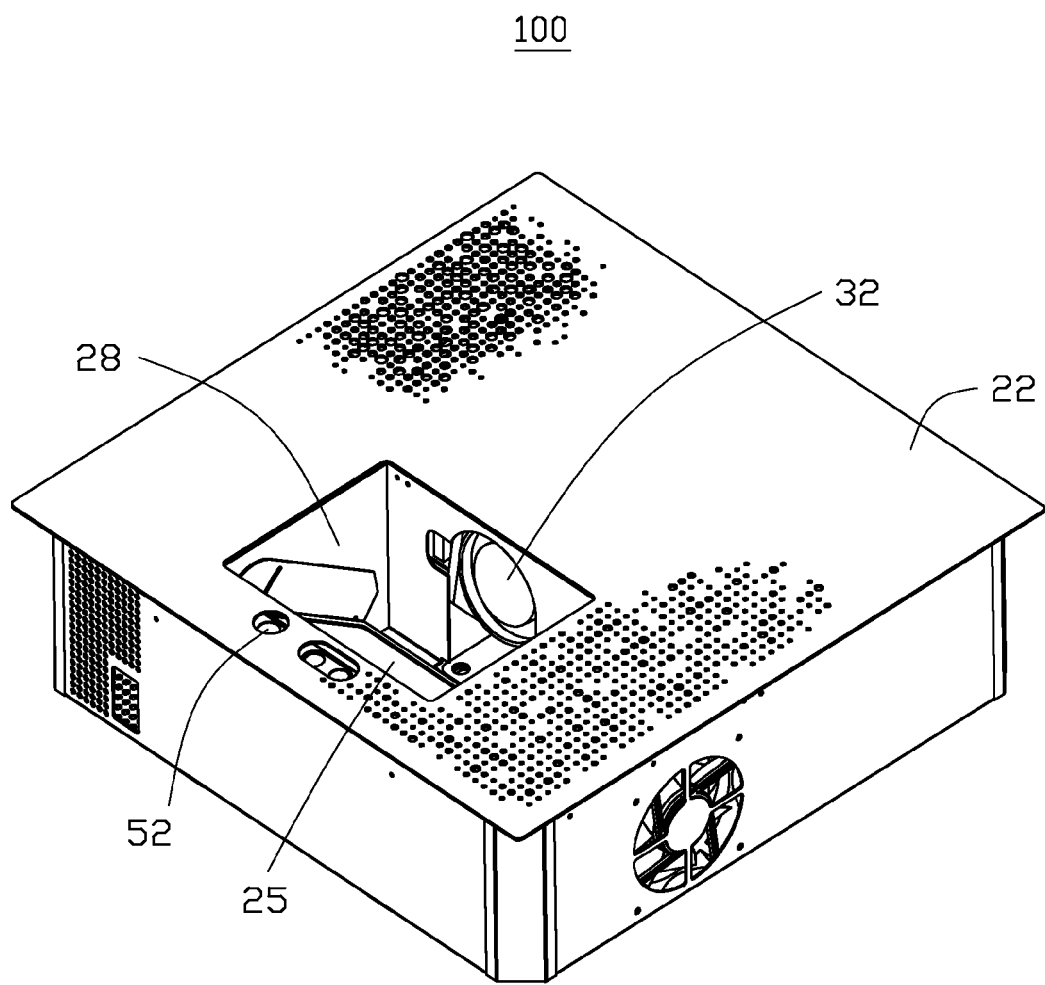
FIG. 2 is similar to FIG. 1, but viewed from another angle.

The projection module 30 connects to the motherboard 40. The motherboard 40 transmits image data of a project to the projection module 30. FIG. 2 illustrates the projection module 30 includes a projection lens 32. The projection module 30 receives the image data and projects the images to a projection medium through the projection lens 32. Thus, an user can play the project on the projection medium. The image capturing module 50 captures playing images on the projection medium and transmits the playing images to the motherboard 40. The motherboard 40 determines the next image according to the playing image and transmits the next image to the projection module 30. The projection module 30 projects the next image to the projection medium. Thus, the user can continuously view the project.

The loudspeaker 60 connects to the motherboard 40. The motherboard 40 further transmits video data corresponding to the image data to the loudspeaker 60. The loudspeaker 60 outputs sound consistently with the video data.

The top shell 22 and the bottom shell 24 are parallel to each other. FIG. 4 illustrates the top shell 22 defines an opening 28 for projecting the image out to the projection medium. In the embodiment, the projection module 30 is fixed between and parallel to the top shell 22 and the bottom shell 24. FIG. 2 illustrates that a reflector 25 is obliquely extended from an edge of the opening 28 toward the bottom shell 24. The reflector 25 faces the projection lens 32. The projection lens 32 projects the image to the reflector 25. Then, the reflector 25 reflects the image to the projection medium. In another embodiment, the projection module 30 is perpendicularly fixed between the top shell 22 and the bottom shell 24. The projection lens 32 is opposite to the opening 28. The projection lens 32 projects the image to the projection medium FIG. 3 illustrates that the top shell 22 further defines a first through hole 21 and a number of second through holes 23. The image capturing module 50 includes a camera lens 52. The camera lens 52 is opposite to the first through hole 21. The loudspeaker 60 is opposite to the second through hole 23. The sound output by the loudspeaker 60 is transmitted out of the shell 20 through the second through hole 23.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A projection device comprising:
   a shell;
   a motherboard fixed in the shell and configured to transmit image data of a project;
   a projection module fixed in the shell and connected to the motherboard, the projection module configured to receive the image data and project images to a projection medium; and
   an image capturing module fixed in the shell and connected to the motherboard, the image capturing module configured to capture playing images on the projection medium and transmit the playing image to the motherboard;

the motherboard further configured to determine next image according to the playing image and transmit the next image to the projection module.

2. The projection device as claimed in claim 1, further comprises a loudspeaker, wherein the motherboard transmitting video data corresponding to the image data to the loudspeaker, the loudspeaker outputting voice consistent with the video data.

3. The projection device as claimed in claim 2, wherein the loudspeaker is fixed in the shell.

4. The projection device as claimed in claim 1, further comprises a power module fixed in the shell, the power module electrically connected to and providing power to the projection module, the motherboard and the image capturing module.

5. The projection device as claimed in claim 1, wherein the shell comprises a top shell, a bottom shell and a sidewall fixed between the top shell and the bottom shell, the top shell and the bottom shell are parallel to each other.

6. The projection device as claimed in claim 5, wherein the top shell further defines a first through hole, the image capturing module comprises a camera lens, the camera lens is opposite to the first through hole.

7. The projection device as claimed in claim 5, wherein the top shell further defines a plurality of second through holes, the loudspeaker is opposite to the plurality of second through holes.

8. The projection device as claimed in claim 5, wherein the top shell defines an opening for projecting the image out to the projection medium.

9. The projection device as claimed in claim 8, wherein the projection module is fixed between and parallel to the top shell and the bottom shell, a reflector is obliquely extended from an edge of the opening toward the bottom shell, the projection module further comprises a projection lens, the reflector faces the projection lens.

10. The projection device as claimed in claim 8, wherein the projection module is perpendicularly fixed between the top shell and the bottom shell, the projection module further comprises a projection lens, the projection lens is opposite to the opening.

11. A projection device comprising:
a shell;
a motherboard fastened in the shell and configured to transmit image data of a project;
a projection module fastened in the shell and communicating with the motherboard, the projection module configured to receive the image data and project images out of the shell; and
an image capturing module fastened in the shell and communicating with the motherboard, the image capturing module configured to capture playing images and transmit the playing image to the motherboard, the playing image is the image loaded operations of a player;
the motherboard further configured to determine next image according to the playing image and transmit the next image to the projection module.

12. The projection device as claimed in claim 11, further comprises a loudspeaker, wherein the motherboard transmitting video data corresponding to the image data to the loudspeaker, the loudspeaker outputting voice consistent with the video data.

13. The projection device as claimed in claim 12, wherein the loudspeaker is fastened in the shell.

14. The projection device as claimed in claim 11, further comprises a power module fastened in the shell, the power module electrically connected to and providing power to the projection module, the motherboard and the image capturing module.

15. A projection device comprising:
a device shell substantially defining an interior space;
a motherboard positioned at least in part within the defined interior space, the motherboard configured to store and transmit to-be-projected image related data;
a projection module positioned at least in part within the defined interior space and configured to receive the to-be-projected image related data from the motherboard, covert the to-be-projected image related data to projectable images and project the projectable images onto a projection receiving surface; and
an image capturing module positioned at least in part within the defined interior space and configured to capture the projectable images projected onto the projection receiving surface, convert the projectable images to projected image related data and transmit the projected image related data to the motherboard;
wherein, the to-be-projected image related data transmitted by the motherboard is based at least in part on the projected image related data received by the motherboard from the image capturing module.

16. The projection device as claimed in claim 15, wherein the device shell comprises a top shell, a bottom shell and a sidewall fixed between the top shell and the bottom shell, the top shell and the bottom shell are parallel to each other.

17. The projection device as claimed in claim 16, wherein the top shell further defines a first through hole, the image capturing module further comprises a camera lens, the camera lens is opposite to the first through hole.

18. The projection device as claimed in claim 16, wherein the top shell defines an opening for projecting the image out to the projection medium.

19. The projection device as claimed in claim 18, wherein the projection module is fixed between and parallel to the top shell and the bottom shell, a reflector is obliquely extended from an edge of the opening toward the bottom shell, the projection module comprises a projection lens, the reflector faces the projection lens.

20. The projection device as claimed in claim 18, wherein the projection module is perpendicularly fixed between the top shell and the bottom shell, the projection module further comprises a projection lens, the projection lens is opposite to the opening.

* * * * *